(12) United States Patent
Zhang et al.

(10) Patent No.: US 9,854,458 B2
(45) Date of Patent: Dec. 26, 2017

(54) DATA TRANSMISSION METHOD AND SYSTEM, AND A NON-TRANSITORY COMPUTER-READABLE STORAGE MEDIUM

(71) Applicant: ZTE CORPORATION, Shenzhen, Guangdong Province (CN)

(72) Inventors: Shuai Zhang, Shenzhen (CN); Jin Xu, Shenzhen (CN); Guanghui Yu, Shenzhen (CN); Shuanshuan Wu, Shenzhen (CN); Lin Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/108,236

(22) PCT Filed: Jul. 1, 2014

(86) PCT No.: PCT/CN2014/081367
§ 371 (c)(1),
(2) Date: Jun. 24, 2016

(87) PCT Pub. No.: WO2015/096444
PCT Pub. Date: Jul. 2, 2015

(65) Prior Publication Data
US 2016/0330634 A1 Nov. 10, 2016

(30) Foreign Application Priority Data
Dec. 27, 2013 (CN) .......................... 2013 1 0740450

(51) Int. Cl.
*H04B 7/155* (2006.01)
*H04W 24/02* (2009.01)
(Continued)

(52) U.S. Cl.
CPC .......... *H04W 24/02* (2013.01); *H04L 1/1835* (2013.01); *H04L 49/201* (2013.01); *H04L 69/22* (2013.01);
(Continued)

(58) Field of Classification Search
None
See application file for complete search history.

(56) References Cited

U.S. PATENT DOCUMENTS

| 6,212,195 B1* | 4/2001 | McCormack ........... H04L 29/06 370/401 |
| 2010/0302999 A1* | 12/2010 | Hui ....................... H04B 7/2606 370/315 |
| 2011/0158295 A1* | 6/2011 | Shiizaki ................. H04B 7/155 375/211 |

FOREIGN PATENT DOCUMENTS

| CN | 1656749 A | 8/2005 |
| CN | 102201911 A | 9/2011 |

OTHER PUBLICATIONS

International search report and Written Opinion dated Oct. 10, 2014 in International application No. PCT/CN2014/081367.

* cited by examiner

*Primary Examiner* — Hicham Foud
*Assistant Examiner* — Ayanah George
(74) *Attorney, Agent, or Firm* — Plumsea Law Group, LLC

(57) ABSTRACT

A method for data transmission includes: if correctly receiving one or more source data packets, a destination node selecting source data packets which have not been saved from the source data packets to save; if receiving one or more network coded data packets, the destination node decoding them, and if the decoding can be correctly conducted and source data packets can be obtained, the desti- (Continued)

nation node selecting source data packets which have not been saved from obtained source data packets to save; if judging that the number of currently saved source data packets is greater than one, the destination node selecting and sending one saved source data to other destination nodes, or after conducting network coding according to part or all of saved source data packets to obtain one or more network coded data packets, the destination node selecting and sending one network coded data packet to other destination nodes.

16 Claims, 2 Drawing Sheets

(51) Int. Cl.
  *H04L 12/931* (2013.01)
  *H04L 29/06* (2006.01)
  *H04L 1/18* (2006.01)
  *H04L 1/00* (2006.01)
(52) U.S. Cl.
  CPC ........ *H04B 7/15557* (2013.01); *H04L 1/1812* (2013.01); *H04L 2001/0093* (2013.01)

If correctly receiving one or more source packets sent by a source node or other destination nodes, a destination node selects source data packets that have not yet been saved from the the source data packets to save; if receiving one or more network coded data packets sent by other destination nodes, the destination node decodes the network coded data packets, and if the decoding can be correctly conducted and the source data packets can be obtained, the destination node selects source data packets that have not been saved from the source data packets obtained through the decoding to save. ⌒ S10

If judging that the number of the currently saved source data packets is greater than one, the destination node selects one saved source data packet and sends it to other destination nodes, or after conducting a network coding based on some or all of the saved source data packets to obtain one or more network coded data packets, the destination node selects one network coded data packet and sends it to other destination nodes. ⌒ S20

FIG. 2

Receiving module

Sending module

FIG. 3

DATA TRANSMISSION METHOD AND SYSTEM, AND A NON-TRANSITORY COMPUTER-READABLE STORAGE MEDIUM

CROSS-REFERENCE TO RELATED APPLICATION(S)

This application is the U.S. National Phase application of PCT application number PCT/CN2014/081367 having a PCT filing date of Jul. 1, 2014, which claims priority of Chinese patent application 201310740450.X filed on Dec. 27, 2013, the disclosures of which are hereby incorporated by reference.

TECHNICAL FIELD

The present document relates to the field of communication technologies, and more particularly, to a method and system for data transmission.

BACKGROUND OF RELATED ART

Traditional method for data transmission in a communication network is store-and-forward, i.e., nodes other than data sending and receiving nodes do not perform any processing on data contents, and only play the role of a repeater.

The Network Coding theory is a major breakthrough in the field of information theory at the beginning of the $21^{st}$ century, and its core idea is to perform linear or non-linear processing on received information of each channel in each node of the network, and then forward to downstream nodes, and intermediate nodes or relays play the roles of encoders or signal processors rather than simply amplify-and-forward or decode-and-forward, thus increasing the network throughput. In point-to-multipoint network communication, the node network coding method can be used to make the information transmission rate reach the maximum network traffic, therefore, the network coding is an effective method that can approach the theoretical transmission limit of network capacity and brings a fundamental revolution for the network communication.

Common network coding methods are bit-level XOR network coding, multi-domain network coding, soft information combined network coding and nested network coding, etc.

In the bit-level XOR network coding method, a node performs an XOR operation of the bit level on received data to complete the information combination and achieves the compression of the received data, and this is a most commonly used coding method in which the network coding technology is applied to the wireless communication network.

In the multi-domain network coding method, the multi-domain network coding method constructs user network coded data packets of multiple users, which usually uses the network coding of GF(4), GF(16), GF(64) or GF(256) domain. Compared with the bit-level XOR network coding, the multi-domain network coding can not only support the network coding of multiple users, but also obtain a higher diversity order, which can more effectively improve the performance brought by the diversity gain.

In the soft relay network coding method, the receiving node does not perform a hard decision on the data, but calculates the Log-Likelihood Ratio (LLR) value based on the received soft-bit information after the network coding, and sends the soft-bit information or its variation version to the destination nodes, thus avoiding the hard decision operation and remaining the bit reliability information, and at the receiving end, using the soft-bit signal processing algorithm can better restore the data sent by the source end.

In the nested network coding method, the receiving node receives coded data packets generated by different source nodes, combines the data packets through the nested coding and forwards them to the destination nodes. Because the generated vectors of an encoder are linearly independent with each other, the destination nodes can decode the combined data packets to obtain the data information sent by any source node.

In traditional modes, the source node increases the probability value of a destination node correctly receiving data information by increasing the number of retransmissions. Therefore, the network reliability is usually related to the number of retransmissions. In the wireless communication shown in FIG. 1, when a plurality of source nodes are surrounded by a plurality of destination nodes and the source nodes broadcast data information, how to improve the network reliability is a technical problem to be solved.

SUMMARY OF THE INVENTION

The technical problem which needs to be solved by the embodiment of the present document is to provide a method and system for data transmission to improve the network transmission reliability.

To solve the abovementioned technical problem, the embodiment of the present document provides a method for data transmission, wherein the method comprises:

if correctly receiving one or more source data packets sent by a source node or other destination nodes, a destination node selecting source data packets that have not yet been saved from the source data packets to save; if receiving one or more network coded data packets sent by other destination nodes, the destination node decoding the network coded data packets, and if the decoding can be correctly conducted and the source data packets can be obtained, the destination node selecting source data packets that have not yet been saved from the source data packets obtained through the decoding to save;

if judging that the number of the currently saved source data packets is greater than one, the destination node selecting one saved source data packet and sending it to other destination nodes, or after conducting a network coding according to part or all of the saved source data packets to obtain one or more network coded data packets, the destination node selecting one network coded data packet and sending it to other destination nodes.

Preferably, the method further comprises the following feature:

if judging that the number of the saved source data packets is equal to one, the destination node directly sends the source data packet to other destination nodes.

Preferably, the method further comprises the following feature:

if judging that the number of currently stored source data packets is greater than one, the destination node selecting one saved source data packet and sending it to other destination nodes, or after selecting some or all of the saved source data packets to conduct the network coding to obtain one or more network coded data packets, the destination node selecting one network coded data packet and sending it to other destination nodes, comprises:

if judging that the number of currently saved source data packets is greater than one, the destination node generating one random number, and judging whether the random number falls within a preset transmission probability interval of source data packets, and if yes, the destination node selecting one saved source data packet and sending it to other destination nodes, otherwise, after selecting some or all of the saved source data packets to conduct the network coding to obtain one or more network coded data packets, the destination node selecting one network coded data packet and sending it to other destination nodes.

Preferably, the method further comprises the following features:

selecting one saved source data packet and sending it to other destination nodes comprises: configuring a transmission probability interval for each source data packet, determining the source data packet to be sent according to the transmission probability interval where the random number is located, and sending the source data packet which is to be sent to other destination nodes;

selecting one network coded data packet and sending it to other destination nodes comprises: configuring a transmission probability interval for each network coded data packet, determining the network coded data packet to be sent according to the transmission probability interval where the random number is located, and sending the network coded data packet which is to be sent to other destination nodes.

Preferably, the method further comprises the following features:

the destination node selecting one saved source data packet and sending it to other destination nodes comprises: the destination node selecting one saved source data packet and multicasting or broadcasting it to other destination nodes;

the destination node selecting one network coded data packet and sending it to other destination nodes comprises: the destination node selecting one network coded data packet and multicasting or broadcasting it to other destination nodes;

wherein, the destination nodes sequentially multicast or broadcast data information to other destination nodes by the way of time division.

Preferably, the method further comprises the following feature:

the probability of the random number falling within the preset transmission probability interval of source data packets is less than 50%.

To solve the abovementioned technical problem, the present document further provides a system for data transmission applied to destination nodes, comprising:

a receiving module, which is configured to: if correctly receiving one or more source data packets sent by a source node or other destination nodes, select source data packets that have not yet been saved from the source data packets to save; if receiving one or more network coded data packets sent by other destination nodes, decode the network coded data packets, and if the decoding can be correctly conducted and the source data packets can be obtained, select source data packets that have not yet been saved from the source data packets obtained through the decoding to save; and a sending module, which is configured to: if judging that the number of currently saved source data packets is greater than one, select one saved source data packet and send it to other destination nodes, or after conducting a network coding according to part or all of the saved source data packets to obtain one or more network coded data packets, select one network coded data packet and send it to other destination nodes.

Preferably, the system further comprises the following feature:

the sending module is further configured to: if judging that the number of saved source data packets is equal to one, directly send the source data packet to other destination nodes.

Preferably, the system further comprises the following feature:

the sending module is configured to: if judging that the number of currently saved source data packets is greater than one, generate a random number, judge whether the random number falls within a preset transmission probability interval of source data packets, and if yes, select one saved source data packet and send it to other destination nodes, otherwise, after selecting some or all of the saved source data packets to conduct the network coding to obtain one or more network coded data packets, select one network coded data packet and send it to other destination nodes.

Preferably, the system further comprises the following features:

the sending module is configured to select one saved source data packet and send it to other destination nodes in the following manner: configuring a transmission probability interval for each source data packet, determining the source data packet to be sent according to the transmission probability interval where the random number is located, and sending the source data packet which is to be sent to other destination nodes;

the sending module is configured to select one network coded data packet and send it to other destination nodes in the following manner: configuring a transmission probability interval for each network coded data packet, determining the network coded data packet to be sent according to the transmission probability interval where the random number is located, and sending the network coded data packet which is to be sent to other destination nodes.

Preferably, the system further comprises the following features:

the sending module is configured to select one saved source data packet and send it to other destination nodes in the following manner: selecting one saved source data packet and multicasting or broadcasting it to other destination nodes;

the sending module is configured to select one network coded data packet and send it to other destination nodes in the following manner: select one network coded data packet and multicast or broadcast it to other destination nodes;

wherein, the destination nodes sequentially multicast or broadcast data information to other destination nodes by way of time division.

Preferably, the system further comprises the following feature:

the probability of the random number falling within the preset transmission probability interval of source data packets is less than 50%.

The embodiment of the present document further provides a computer program comprising program instructions, when the program instructions are executed by the destination nodes, the destination nodes can execute the method in accordance with the embodiment of the present document.

The embodiment of the present document further provides a carrier carrying the abovementioned computer program.

The method and system for data transmission provided in the embodiment of the present document can improve the network transmission reliability by the destination nodes participating in the data forwarding (sending network coded packets or source data packets).

BRIEF DESCRIPTION OF THE DRAWINGS

FIG. 2 is a flow chart of a method for data transmission in accordance with an embodiment of the present document.

FIG. 3 is a schematic diagram of the structure of a system for data transmission in accordance with an embodiment of the present document.

PREFERRED EMBODIMENTS OF THE INVENTION

Figure 1:
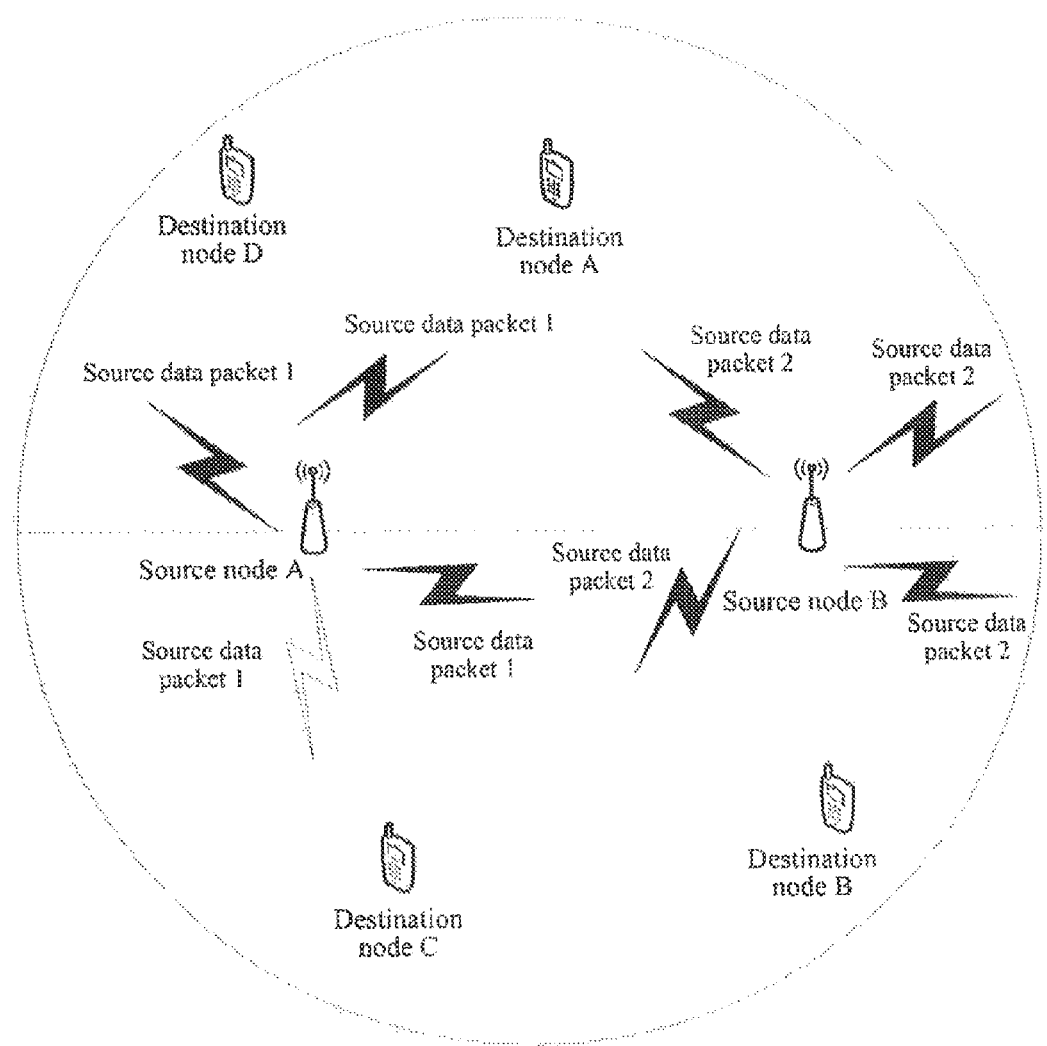
FIG. 1 is a schematic diagram of a wireless communication system in the related art (a plurality of source nodes are surrounded by a plurality of destination nodes).

Hereinafter, in conjunction with the accompanying drawings, embodiments of the present document will be described in detail. It should be noted that, in the case of no conflict, embodiments and features in the embodiments of the present application may be arbitrarily combined with each other.

As shown in FIG. 1, the embodiment of the present document provides a method for data transmission, wherein the method comprises:

in S10, if correctly receiving one or more source data packets sent by a source node or other destination nodes, a destination node selects source data packets that have not yet been saved from the source data packets to save; if receiving one or more network coded data packets sent by other destination nodes, the destination node decodes the network coded data packets, and if the decoding can be correctly decoded and the source data packets can be obtained, the destination node selects source data packets that have not yet been saved from the source data packets obtained through the decoding to save;

in S20, if judging that the number of the currently saved source data packets is greater than one, the destination node selects one saved source data packet and sends it to other destination nodes, or after conducting a network coding according to part or all of the saved source data packets to obtain one or more network coded data packets, the destination node selects one network coded data packet and sends it to other destination nodes.

The method may further comprise the following feature:

wherein, the source node is a node sending the data packets, comprising: a base stations or a user terminal; the destination node is a node sending or forwarding the data packets, comprising: a user terminal.

In the step S20, if judging that the number of the saved source data packets is equal to one, the destination node directly sends the source data packet to other destination nodes.

In step S20, if judging that no source data packet is saved, the destination node sends no data packet to other destination nodes.

Preferably, the destination node selecting one saved source data packet and sending it to other destination nodes comprises: the destination node selecting one saved source data packet and multicasting or broadcasting it to other destination nodes; the destination node selecting one network coded data packet and sending it to other destination nodes comprises: the destination node selecting one network coded data packet and multicasting or broadcasting it to other destination nodes;

The Device to Device communication has been discussed in 3GPP-R11, in which he base station allocates resources to terminals in the cell, and the base station sends signaling to assist in the communication between the terminals, the terminal multicasts or broadcasts the data information to other terminals within the cell through coding and modulation, and the sharing of information resources is completed through cooperative communication between the terminals.

Wherein, a plurality of destination nodes sequentially multicast or broadcast the data information to other destination nodes by way of time division, in all the destination nodes, when one destination node sends the data information, other destination nodes are only in the state of receiving data.

In step S20, if judging that the number of currently stored source data packets is greater than one, the destination node selecting one saved source data packet and sending it to other destination nodes, or after selecting some or all of the saved source data packets to conduct the network coding to obtain one or more network coded data packets, the destination node selecting one network coded data packet and sending it to other destination nodes, comprises:

if judging that the number of currently saved source data packets is greater than one, the destination node generates a random number, and judges whether the random number falls within a preset transmission probability interval of source data packets, and if yes, the destination node selects one saved source data packet and sends it to other destination nodes, otherwise, after selecting some or all of the saved source data packets to conduct the network coding to obtain one or more network coded data packets, the destination node selects one network coded data packet and sends it to other destination nodes.

Preferably, selecting one saved source data packet and sending it to other destination nodes comprises: configuring a transmission probability interval for each source data packet, determining the source data packet to be send according to the transmission probability interval where the random number is located, and sending the source data packet which is to be sent to other destination nodes;

preferably, selecting one network coded data packet and sending it to other destination nodes comprises: configuring a transmission probability interval for each network coded data packet, determining the network coded data packet to be send according to the transmission probability interval where the random number is located, and sending the network coded data packet which is to be sent to other destination nodes.

Preferably, in the step S20, selecting some or all of the saved source data packets to conduct the network coding comprises: selecting some or all of the saved source data packets, and using any of the following network coding methods to conduct the network coding: a bit-level XOR network coding method, a multi-domain network coding method, a soft relay network coding method or a nested network coding method.

Preferably, the probability of the random number falling within a preset transmission probability interval of source data packets is less than 50%; in order to improve the reliability, the probability of the random number falling within the preset transmission probability interval of source data packets can be less, for example, less than 10%.

If the destination node only sends the network coded data packets, as a result, some destination nodes (especially destination nodes at the cell edges) can only correctly receive network coded data packets but not the source data packet, in such a case, the destination node cannot obtain the source data packet information through the only received network coded data packets. Based on this, in order to make the transmission of the network coding more efficient, we make the destination node forward the source data packet with a relatively low probability through the probability forwarding way, so that some destination nodes at the cell edges can obtain more source data packet information through the network coding and decoding.

In the related art, because the source node needs to increase the number of retransmissions by itself in order to improve the network reliability, while excessively increasing the number of retransmissions requires a large amount of transmission slots in order to obtain a certain reliability. The embodiment of the present document make the destination nodes participate in the data forwarding (sending network coded packets or source data packets), and compared to traditional source node retransmission methods, the system reliability is improved in the case that the number of transmission slots is the same.

As shown in FIG. 2, the embodiment of the present document further provides a system for data transmission applied to destination nodes, comprising:

a receiving module, configured to, if correctly receiving one or more source data packets sent by source nodes or other destination nodes, select source data packets that have not yet been saved from the source data packets to save; if receiving one or more network coded data packets sent by other destination nodes, decode the network coded data packets, and if the decoding can be correctly conducted and the source data packets can be obtained, select source data packets that have not yet been saved from the source data packets obtained through the decoding to save;

a sending module, configured to, if judging that the number of the currently saved source data packets is greater than one, select one saved source data packet and send it to other destination nodes, or after conducting a network coding according to part or all of the saved source data packet to obtain one or more network coded data packets, select one network coded data packet and send it to other destination nodes.

The system may further comprise the following feature:

wherein, the source node is a node sending the data packets, comprising: a base station or a user terminal; the destination node is a node sending or forwarding the data packets, comprising: a user terminal.

Preferably, the sending module is further configured to, if judging that the number of the saved source data packets is equal to one, directly send the source data packet to other destination nodes.

Preferably, the sending module is further configured to, if judging that no source data packet is saved, send no data packet to other destination nodes.

Preferably, the sending module is configured to:

if judging that the number of currently saved source data packets is greater than one, generate a random number, and judge whether the random number falls within a preset transmission probability interval of source data packets, and if yes, select one saved source data packet and send it to other destination nodes, otherwise, after selecting some or all of the saved source data packets to conduct the network coding to obtain one or more network coded data packets, select one network coded data packet and send it to other destination nodes.

Preferably, the sending module is configured to select one saved source data packet and send it to another destination node in the following manner: configuring a transmission probability interval for each source data packet, determining the source data packet to be sent according to the transmission probability interval where the random number is located, and sending the source data packet which is to be sent to other destination nodes;

preferably, the sending module is configured to select one network coded data packet and send it to other destination nodes in the following manner: configuring a transmission probability interval for each network coded data packet, determining the network coded data packet to be sent according to the transmission probability interval where the random number is located, and sending the network coded data packet which is to be sent to other destination nodes.

Preferably, the sending module is configured to select one saved source data packet and send it to other destination nodes in the following manner: selecting one saved source data packet and multicasting or broadcasting it to other destination nodes;

the sending module is configured to select one data coded data packet and send it to other destination nodes in the following manner: selecting one network coded data packet and multicasting or broadcasting it to other destination nodes;

Wherein, the destination nodes sequentially multicast or broadcast the data information to other destination nodes by way of time division.

Preferably, the probability of the random number falling within a preset transmission probability interval of source data packets is less than 50%; in order to improve the reliability, the probability of the random number falling within the preset transmission probability interval of source data packets can be less, for example, less than 10%.

The embodiment of the present document further provides a computer program comprising program instructions, when the program instructions are executed by the destination nodes, the destination nodes can execute the method in accordance with the embodiment of the present document.

The embodiment of the present document further provides a carrier carrying the abovementioned computer program.

APPLICATION EXAMPLE

This application example describes four processes of a destination node receiving, decoding, coding and transmitting data packets:

in the receiving process, it is to receive five source data packets respectively sent by five source nodes and ten network coded packets respectively sent by ten other destination nodes, as well as nine source data packets respectively sent by nine other destination nodes. Wherein both the source data packets and the network coded packets consist of data packets with 1000 bits (the bit 0 or the bit 1), and the information bit forms and lengths in the network coded packets and the source data packets are the same.

In the decoding process, assume that the source data packets sent by the three source nodes, the network coded packets sent by three other destination nodes, and the source data packets sent by three other destination nodes are correctly received. Three source data packets are obtained by network coding and decoding the network coded packets and the source data packets.

In the coding process, assume that the node has saved the three source data packets, and correctly received the source data packets sent by three source nodes, as well as newly obtained three source data packets through the network coding and decoding, and correctly received three source data packets sent by other destination nodes, for the newly received and decoded source data packets, after comparing them with the saved source data packets, only the unsaved source data packets are saved, that is, the set of updated saved source data packets is.

in the transmitting process, it is to judge that the number of saved source data packets is 5, that is, greater than 1, the preset transmission probability interval of source data packets is [0.8, 1], it is to generate a random number r in the interval [0, 1], and if r=0.91, r falls within the transmission probability interval of source data packets, and the probability interval of each source data packet is configured to be:

When r=0.91, r falls within the transmission probability interval corresponding to the data3, the source data packet data3 is sent to other destination nodes. If r=0.52, r does not fall within the transmission probability interval of source data packets, all the five source data packets are selected for the network coding, and four network coded packets are generated, and the transmission probability interval of the four network coded packets is configured to be: and when r=0.52, r falls within the transmission probability interval corresponding to the packet3, and the network coded packet packet3 is sent to other destination nodes.

The method and system for data transmission provided in the abovementioned embodiments can improve the network transmission reliability while reducing the number of system retransmissions by the destination nodes participating in data forwarding (sending the network coded packets or the source data packets).

Those ordinarily skilled in the art can understand that all or some of steps of the abovementioned method may be completed by the programs instructing the relevant hardware, and the programs may be stored in a computer-readable storage medium, such as read only memory, magnetic or optical disk etc. Alternatively, all or some of the steps of the abovementioned embodiments may also be implemented by using one or more integrated circuits. Accordingly, each module/unit in the abovementioned embodiments may be realized in a form of hardware, or in a form of software function modules. The present document is not limited to any specific form of hardware and software combinations.

It should be noted that the present document has many other embodiments, and without departing from the rule and essence of the present document, those skilled in the art can make various modifications and changes. These corresponding modifications and changes should be included within the protection scope of the appended claims of the present document.

INDUSTRIAL APPLICABILITY

The embodiment of the present document can improve the network transmission reliability by destination nodes participating in the data forwarding (sending network coded packets or source data packets).

What is claimed is:

1. A method for data transmission, comprising:
if correctly receiving one or more source data packets sent by a source node or other destination nodes, a destination node selecting source data packets that have not yet been saved from the source data packets to save; if receiving one or more network coded data packets sent by other destination nodes, the destination node decoding the network coded data packets, and if decoding can be correctly performed and source data packets can be obtained, the destination node selecting source data packets that have not yet been saved from the source data packets obtained through the decoding to save;
if determining that the number of currently saved source data packets is greater than one, the destination node selecting one saved source data packet and sending the one saved source data packet to other destination nodes, or after performing network coding according to part or all of saved source data packets to obtain one or more network coded data packets, the destination node selecting one network coded data packet and sending the one network coded data packet to other destination nodes;
wherein if determining that the number of currently saved source data packets is greater than one, the destination node selecting one saved source data packet and sending the one saved source data packet to other destination nodes, or after selecting part or all of saved source data packets to perform the network coding to obtain one or more network coded data packets, the destination node selecting one network coded data packet and sending the one network coded data packet to other destination nodes, comprises:
if determining that the number of currently saved source data packets is greater than one, the destination node generating one random number, and judging whether the random number falls within a preset transmission probability interval of source data packets, and if yes, the destination node selecting one saved source data packet and sending the one saved source data packet to other destination nodes, otherwise, after selecting part or all of the saved source data packets to perform the network coding to obtain one or more network coded data packets, the destination node selecting one network coded data packet and sending the one network coded data packet to other destination nodes.

2. The method of claim 1, wherein the method further comprises:
if determining that the number of the saved source data packets is equal to one, the destination node directly sends the source data packet to other destination nodes.

3. The method of claim 1, wherein:
selecting one saved source data packet and sending the one saved source data packet to other destination nodes comprises: configuring one transmission probability interval for each source data packet, determining a source data packet to be sent according to a transmission probability interval where the random number is located, and sending the source data packet to be sent to other destination nodes;
selecting one network coded data packet and sending the one network coded data packet to other destination nodes comprises: configuring one transmission probability interval for each network coded data packet, determining a network coded data packet to be sent according to a transmission probability interval where the random number is located, and sending the network coded data packet to be sent to other destination nodes.

4. The method of claim 1, wherein:
the destination node selecting one saved source data packet and sending the one saved source data packet to other destination nodes comprises: the destination node selecting one saved source data packet and multicasting or broadcasting the one saved source data packet to other destination nodes;
the destination node selecting one network coded data packet and sending the one network coded data packet to other destination nodes comprises: the destination node selecting one network coded data packet and multicasting or broadcasting the one network coded data packet to other destination nodes;

wherein, the destination nodes sequentially multicast or broadcast data information to other destination nodes by a way of time division.

5. The method of claim 1, wherein:

the probability of the random number falling within the preset transmission probability interval of source data packets is less than 50%.

6. A system for data transmission, applied to destination nodes, comprising a processor, and a storage device for storing computer executable instructions that when executed by the processor cause the processor to perform the steps in the following modules:

a receiving module, which is configured to: if correctly receiving one or more source data packets sent by a source node or other destination nodes, select source data packets that have not yet been saved from the source data packets to save; if receiving one or more network coded data packets sent by other destination nodes, decode the network coded data packets, and if decoding can be correctly performed and source data packets can be obtained, select source data packets that have not yet been saved from the source data packets obtained through the decoding to save; and a sending module, which is configured to: if determining that the number of currently saved source data packets is greater than one, select one saved source data packet and send the one saved source data packet to other destination nodes, or after performing network coding according to part or all of saved source data packets to obtain one or more network coded data packets, select one network coded data packet and send the one network coded data packet to other destination nodes;

wherein the sending module is configured to: if determining that the number of currently saved source data packets is greater than one, generate one random number, judge whether the random number falls within a preset transmission probability interval of source data packets, and if yes, select one saved source data packet and send the one saved source data packet to other destination nodes, otherwise, after selecting part or all of saved source data packets to perform the network coding to obtain one or more network coded data packets, select one network coded data packet and send the one network coded data packet to other destination nodes.

7. The system of claim 6, wherein:

the sending module is further configured to: if determining that the number of saved source data packets is equal to one, directly send the source data packet to other destination nodes.

8. The system of claim 6, wherein:

the sending module is configured to select one saved source data packet and send the one saved source data packet to other destination nodes in the following manner: configuring one transmission probability interval for each source data packet, determining a source data packet to be sent according to a transmission probability interval where the random number is located, and sending the source data packet to be sent to other destination nodes;

the sending module is configured to select one network coded data packet and send the one network coded data packet to other destination nodes in the following manner: configuring one transmission probability interval for each network coded data packet, determining a network coded data packet to be sent according to a transmission probability interval where the random number is located, and sending the network coded data packet to be sent to other destination nodes.

9. The system of claim 6, wherein:

the sending module is configured to select one saved source data packet and send the one saved source data packet to other destination nodes in the following manner: selecting one saved source data packet and multicasting or broadcasting the one saved source data packet to other destination nodes;

the sending module is configured to select one network coded data packet and send the one network coded data packet to other destination nodes in the following manner: select one network coded data packet and multicast or broadcast the one network coded data packet to other destination nodes;

wherein, the destination nodes sequentially multicast or broadcast data information to other destination nodes by a way of time division.

10. The system of claim 6, wherein:

the probability of the random number falling within the preset transmission probability interval of source data packets is less than 50%.

11. A non-transitory computer-readable storage medium, storing computer-executable instructions, when the computer-executable instructions are executed by destination nodes, to perform the method of claim 1.

12. The method of claim 2, wherein:

the destination node selecting one saved source data packet and sending the one saved source data packet to other destination nodes comprises: the destination node selecting one saved source data packet and multicasting or broadcasting the one saved source data packet to other destination nodes;

the destination node selecting one network coded data packet and sending the one network coded data packet to other destination nodes comprises: the destination node selecting one network coded data packet and multicasting or broadcasting the one network coded data packet to other destination nodes;

wherein, the destination nodes sequentially multicast or broadcast data information to other destination nodes by a way of time division.

13. The method of claim 3, wherein:

the destination node selecting one saved source data packet and sending the one saved source data packet to other destination nodes comprises: the destination node selecting one saved source data packet and multicasting or broadcasting the one saved source data packet to other destination nodes;

the destination node selecting one network coded data packet and sending the one network coded data packet to other destination nodes comprises: the destination node selecting one network coded data packet and multicasting or broadcasting the one network coded data packet to other destination nodes;

wherein, the destination nodes sequentially multicast or broadcast data information to other destination nodes by a way of time division.

14. The method of claim 3, wherein:

the probability of the random number falling within the preset transmission probability interval of source data packets is less than 50%.

15. The system of claim 8, wherein:
the probability of the random number falling within the preset transmission probability interval of source data packets is less than 50%.

16. A non-transitory computer-readable storage medium, storing computer-executable instructions, when the computer-executable instructions are executed by destination nodes, to perform the method of claim 2.

* * * * *